(12) United States Patent
Heikkilä

(10) Patent No.: US 9,461,891 B2
(45) Date of Patent: Oct. 4, 2016

(54) METHOD FOR REPORTING SERVICE QUALITY FOR OVER THE TOP SERVICES IN A COMMUNICATION NETWORK

(75) Inventor: Gunnar Heikkilä, Gammelstad (SE)

(73) Assignee: TELEFONAKTIEBOLAGET L M ERICSON, Stockholm (SE)

( * ) Notice: Subject to any disclaimer, the term of this patent is extended or adjusted under 35 U.S.C. 154(b) by 8 days.

(21) Appl. No.: 14/376,465

(22) PCT Filed: Feb. 6, 2012

(86) PCT No.: PCT/SE2012/050112
§ 371 (c)(1),
(2), (4) Date: Aug. 4, 2014

(87) PCT Pub. No.: WO2013/119150
PCT Pub. Date: Aug. 15, 2013

(65) Prior Publication Data
US 2014/0376396 A1    Dec. 25, 2014

(51) Int. Cl.
*H04L 12/24*   (2006.01)
*H04W 24/08*   (2009.01)
*H04W 72/08*   (2009.01)
*H04L 12/26*   (2006.01)

(52) U.S. Cl.
CPC ....... *H04L 41/5009* (2013.01); *H04L 41/5032* (2013.01); *H04L 43/08* (2013.01);
(Continued)

(58) Field of Classification Search
CPC .......... H04L 41/5009; H04L 41/5032; H04L 43/08; H04L 43/16; H04L 41/0654; H04L 43/0852; H04L 43/087; H04L 43/0894; H04L 41/0686; H04L 43/0829; H04W 24/08; H04W 72/085

USPC .......................................... 370/252, 328, 329
See application file for complete search history.

(56) References Cited

U.S. PATENT DOCUMENTS 8,260,907 B2 * 9/2012 O'Sullivan ......... H04L 12/2697
370/389
2003/0120773 A1 6/2003 Mueller et al.
(Continued)

FOREIGN PATENT DOCUMENTS

EP         1 659 743 A1    5/2006
WO     WO 2009/155971    12/2009

OTHER PUBLICATIONS

PCT International Preliminary Report on Patentability for International application No. PCT/SE2010/050112, Aug. 12, 2014.
(Continued)

*Primary Examiner* — Mark Rinehart
*Assistant Examiner* — Kenneth P Hunt
(74) *Attorney, Agent, or Firm* — Patents on Demand, P.A.; Brian K. Buchheit; Scott M. Garrett

(57) ABSTRACT

A method (300) for executing an application on a user terminal in a cellular communications system, comprising measuring (305) the service quality available to the application in the cellular communications system and sending information (310) on the measured service quality to a node in the cellular communications system. If the service quality is degraded (315) to be below a predefined threshold, an analysis is performed of why the service quality is below said threshold and the results of said analysis is transmitted (325) to a node in the cellular communications system, the results comprising (330) one or more reasons for the degradation of the service quality as well as information (335) grading the impact of said reasons on the degradation of the service quality.

23 Claims, 4 Drawing Sheets

(52) U.S. Cl.
CPC ............. *H04L 43/16* (2013.01); *H04W 24/08* (2013.01); *H04W 72/085* (2013.01); *H04L 41/0654* (2013.01); *H04L 41/0686* (2013.01); *H04L 43/087* (2013.01); *H04L 43/0829* (2013.01); *H04L 43/0852* (2013.01); *H04L 43/0894* (2013.01)

(56) References Cited

U.S. PATENT DOCUMENTS

| | | | | |
|---|---|---|---|---|
| 2012/0069748 | A1* | 3/2012 | Van Den Bogaert . | H04W 24/10 370/252 |
| 2012/0203788 | A1* | 8/2012 | Magyar ............... | H04L 41/5009 707/748 |
| 2013/0028114 | A1* | 1/2013 | Gutierrez, Jr. ... | G06Q 10/06393 370/252 |
| 2013/0114446 | A1* | 5/2013 | Liu ....................... | H04W 24/10 370/252 |
| 2014/0043973 | A1* | 2/2014 | Groenendijk ....... | H04L 41/5032 370/230 |
| 2015/0103670 | A1* | 4/2015 | Wu ....................... | H04W 28/24 370/236.1 |

OTHER PUBLICATIONS

3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10), 2011.

PCT International Search Report for International Application No. PCT/SE2012/050112; International Filing Date Jun. 2, 2012, Feb. 21, 2013.

"Path Switching and Call Protection for Reliable IP Telephony" by Karacali et al., 2007.

"3rd Generation Partnership Project; Technical Specification Group Radio Access Network; Radio Resource Control (RRC); Protocol specification (Release 10)", 2011.

"RTP Control Protocol Extended Reports (RTCP XR)" by Friedman et al., 2007.

"QoS assessment of video streams over IP networks based on monitoring transport and application layer processes at user clients" by Masugi et al., 2005.

Extended European search report for Application No./U.S. Pat. No. 12868040.2-1862 /2813031 PCT/SE2012050112, Jul. 13, 2015.

RTP Control Protocol Extended Reports (RTCP XR) by T. Friedman et al.; Request for Comments: 3611; Category: Standards Track; Network Working Group, Nov. 2003.

3GPP TS 25.331 V10.4.0; Technical Specification; 3rd Generation Partnership Project; Technical Specification Group Radio Access Network; Radio Resource Control (RRC); Protocol specification (Release 10) (XP-002725648), Jun. 2011.

* cited by examiner

METHOD FOR REPORTING SERVICE QUALITY FOR OVER THE TOP SERVICES IN A COMMUNICATION NETWORK

PRIORITY

This nonprovisional application is a U.S. National Stage Filing under 35 U.S.C. §371 of International Patent Application Serial No. PCT/SE2012/050112, filed Feb. 6, 2012 and entitled "Method for Reporting Service Quality for Over the Top Services in A Communication Network."

TECHNICAL FIELD

The present invention discloses a method for operating a node in a cellular communications system, as well as such a node and a method for executing an application on a user terminal in a cellular communications system.

BACKGROUND

The use of cellular systems has evolved from speech-only into the use of a multitude of different services, many of them IP-based, i.e. based on the Internet Protocol. An operator of a cellular system naturally has a desire to keep the service quality provided to users of the cellular system at as high a level as possible, since this will give the operator a competitive edge. Thus, there is also a desire for an operator to be able to measure the service quality provided to users. Existing methods for measuring the service quality provided to users comprise the RTP/RTCP protocol and the RTCP/XR protocols.

More and more applications which are executed on user terminals in cellular systems are so called "over the top" services, i.e. services which are not provided by the operator of the system, but services for which it is still important to maintain a high level of quality of service. Typically, "over the top services" do not use the RTP protocol, and thus, reporting solutions based on the RTP/RTCP or RTCP/XR protocols cannot be used.

Different over the top services may require service from different nodes in a cellular system, so a solution to measuring the quality of service for over the top services, as well as detecting and, where applicable, remedying degradation of the quality of service for over the top services, should be possible to apply in different nodes in a cellular system.

SUMMARY

It is an object to provide a solution by means of which the service given to users of over the top services in a cellular communications system may be kept at a high level.

This object is addressed by means of a method for operating a node in a cellular communications system. The method comprises receiving information from an application which has been or is being executed on a user terminal in the cellular communications system, and further comprises extracting data from the received information regarding the service quality given by the cellular communications system to the application as well as data indicating one or more reasons for any degradation of the service quality and data on the impact of said reasons on said degradation.

In embodiments of the method, the received information is information which has been provided and/or measured by the application In embodiments of the method, the data on the impact of said reasons comprises an internal order of the reasons according to their impact.

In embodiments, the method comprises remedying one or more of the reasons for any service quality degradation.

In embodiments, the method comprises storing one or more of said reasons for service quality degradation.

In embodiments of the method, the reasons for any service quality degradation comprise one or more of jitter, bit-rate, packet loss and delay.

In embodiments of the method, the information from the application is received via the cellular communications system's radio resource control protocol.

In embodiments of the method, the node in the cellular communications system is a node in the Operations support System of the cellular communications system.

In embodiments of the method, the node in the cellular communications system is a node in the Network Management System of the cellular communications system.

In embodiments of the method, the cellular communications system is an LTE or a 3G system.

There is also disclosed a method for executing an application on a user terminal in a cellular communications system. The method comprises measuring the service quality available to the application in the cellular communications system and sending information on the measured available service quality to a node in the cellular communications system, and comparing the measured available service quality to a predefined threshold. If the available service quality is degraded so that it is below the predefined threshold, the method comprises performing an analysis of why the available service quality is degraded and transmitting the results of this analysis to a node in the cellular communications system, the results comprising one or more reasons for the degradation of the available service quality as well as information which grades the impact of said reasons on the degradation of the available service quality.

In embodiments of the method, one or more of the following is performed by or in the application:
  Measuring the available service quality,
  Sending information on the measured available service quality,
  Performing said analysis,
  Transmitting the results of said analysis to a node in the cellular communications system.

According to embodiments of the method, the information grading the impact of the reasons comprises ordering the reasons according to their impact.

According to embodiments of the method, the one or more reasons for service quality degradation comprise one or more of jitter, bit-rate, packet loss and delay.

According to embodiments of the method, the information from the application is transmitted via the cellular communications system's radio resource control protocol.

There is also disclosed a node for a cellular communications system. The node is arranged to receive information from an application which has been or is being executed on a user terminal in the cellular communications system, and the node is further arranged to extract data from the received information regarding the service quality given by the cellular communications system to the application as well as to extract data indicating one or more reasons for any degradation of the service quality and data on the impact of the reasons on the degradation.

In embodiments of the node, the received information is information which has been provided and/or measured by the application In embodiments of the node, the extracted data on the impact of the reasons comprises an internal ordering of the reasons according to their impact.

In embodiments, the node is additionally arranged to remedy one or more of the reasons for service quality degradation.

In embodiments, the node is arranged to store one or more of the reasons for service quality degradation.

In embodiments of the node, the reasons for service quality degradation comprise one or more of jitter, bit-rate, packet loss and delay.

In embodiments, the node is arranged to receive the information from the application via the cellular communications system's radio resource control protocol.

In embodiments, the node is a node in the Operations support System of the cellular communications system.

In embodiments, the node is a node in the Network Management System of the cellular communications system.

In embodiments, the node is a node in an LTE or a 3G system.

BRIEF DESCRIPTION OF THE DRAWINGS

The invention will be described in more detail in the following, with reference to the appended drawings, in which.

DETAILED DESCRIPTION

Figure 1:
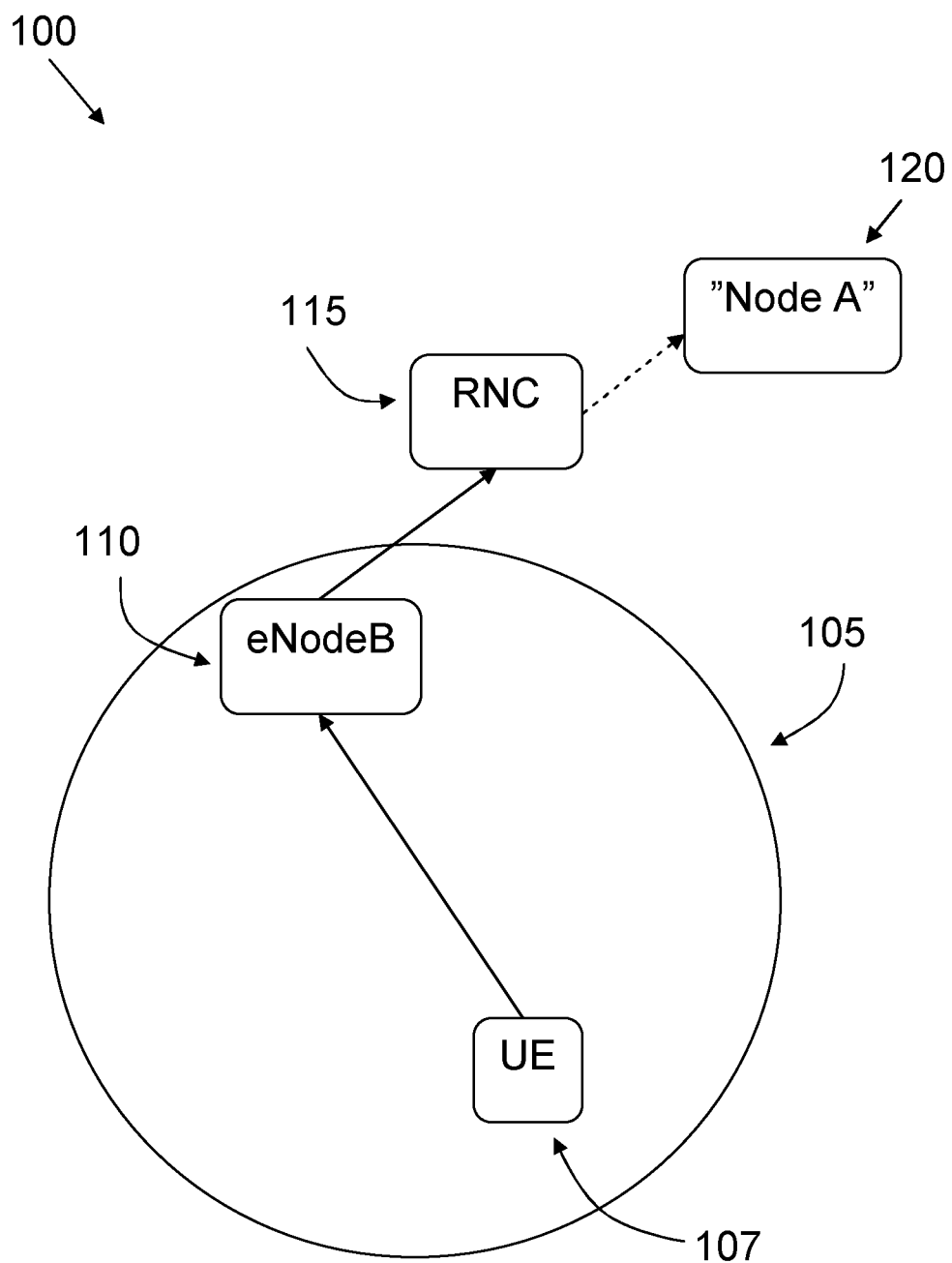
FIG. 1 shows a cellular communication system.

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

FIG. 1 shows a generalized view of a part of a cellular communications system 100. The terminology used in order to describe the cellular communication system 100 is in part that of an LTE system, although this is by way of example only; the cellular communication system 100 in which the invention is applied can be a wide variety of such systems, of which LTE is only one example; 3G systems are examples of other kinds of cellular communication systems in which the invention may be applied, as well as CDMA and WiMAX cellular communication systems.

FIG. 1 shows a cell 105 in the cellular communications system 100. Such cells can accommodate a number of user terminals, also known as User Equipments, UEs, one of which, 107, is shown as an example. All communication to and from the UEs in the cell 105 passes through a node 110 which is sometimes generically referred to as a "base station", or, in the LTE case, an eNodeB, as shown in FIG. 1. The eNodeB is connected to "higher" nodes in the system 100, such as, for example, an RNC 115. Other examples of higher nodes in the system are nodes in the Operations Support System of the system 100, and nodes in the Network Management System of the system 100. The RNC 115 is in turn connected to such higher nodes in the system 100, one such node being indicated generically as "Node A" 120. The RNC 115 is shown as being connected to the "Node A" 120 by means of dashed lines in order to indicate that the connection may not be direct, i.e. that there may be other intermediate nodes between the RNC 115 and the "Node A" 120.

The UEs in a cell have mainly, until recently, been arranged and used to execute applications which are supplied by the operator of the cellular communications system 100, such as voice or data sessions. However, in addition to such applications, applications which are not supplied by the operator of the cellular communications system 100 are becoming increasingly popular. Such application are sometimes referred to as "over the top" services. However, although over the top services aren't supplied by the operators of the cellular communications systems, an operator of a cellular communications systems of course still has a desire to maintain a high level of service to a user who executes such services on his UE.

Figure 2:
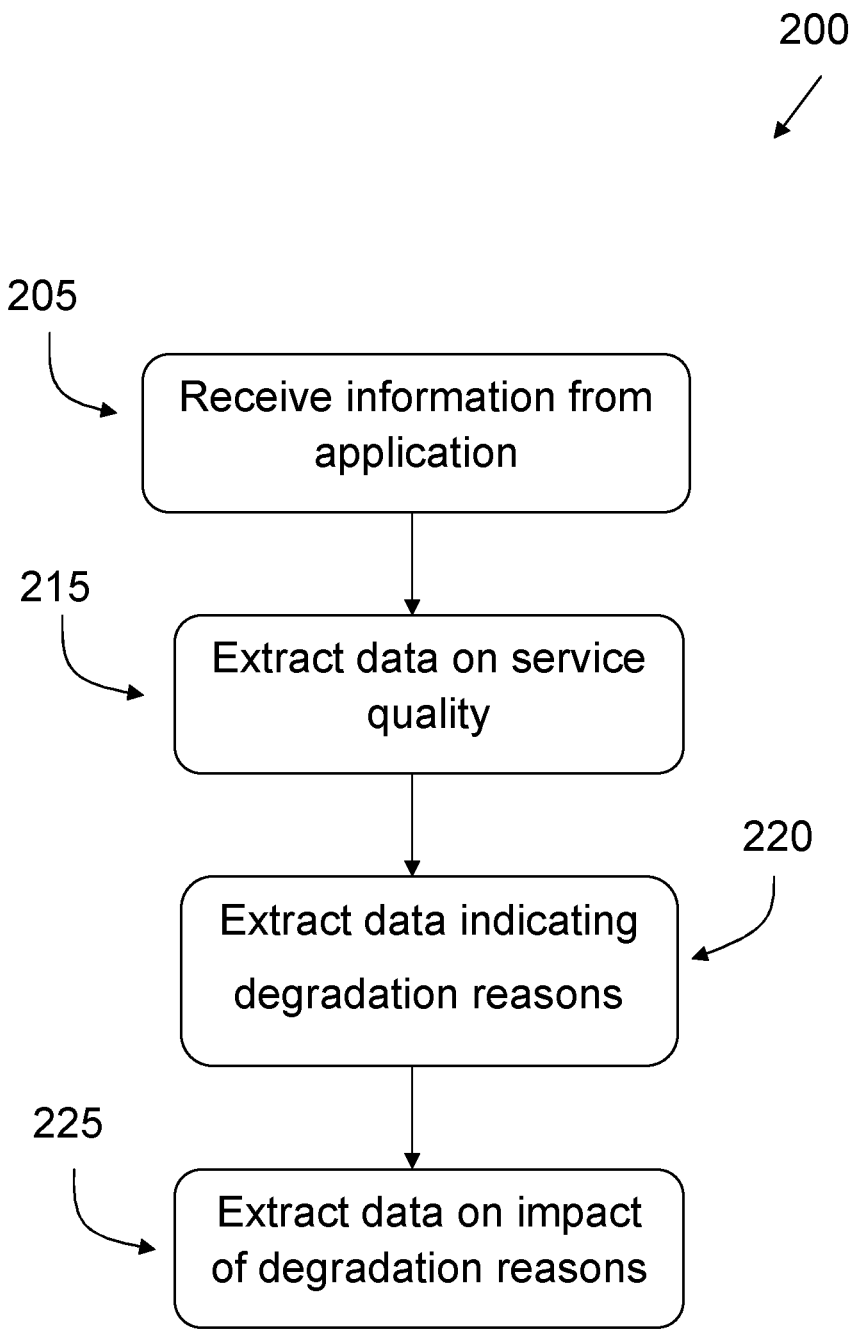
FIG. 2 shows a schematic flow chart of a first method of the invention.

FIG. 2 shows a flow chart of a method for operating a node such as the node 120 in a cellular communications system such as the one 100 in FIG. 1. As shown in step 205, the method 200 comprises receiving information from an application which has been or is being executed on a user terminal such as the one 105 in the cellular communications system 100.

The method 200 also comprises, as shown in step 215, extracting data from the received information regarding the service quality given by the cellular communications system 100 to the application as well as, step 220, extracting data from the received information which indicates one or more reasons for any degradation of the service quality. As shown in step 225, the method also comprises extracting data from the received information on the impact of said reasons on said degradation. Thus, each, or some of the reasons, which is/are extracted, are provided with an indication of their respective impact on the degradation of quality of service, i.e. reason no 1—45%, reason no 2—25%, reason no 3—17%, reason no 4—13%.

Regarding the term "degradation of service quality", this refers to a case where one or more parameters which indicate service of quality fall below a predefined threshold, as measured by the application in the UE 107, or a case where a "composite" service of quality value has fallen below a predefined threshold, the composite service of quality value being comprised of two or more parameters.

Examples of such parameters, which may be among the extracted reasons include one or more of jitter, bit-rate, packet loss and delay.

As for the term "service quality" as used herein, an operator of a cellular communications system or a designer of an application which has been or is being executed on a user terminal in a cellular communications system can of course define this term in a wide variety of ways. However, one way in which "service of quality" is often defined is the so called "integrity of service", i.e. that the service provided is high while the application in question is being executed.

A common way of measuring such "integrity of service" is the MOS, the Mean Opinion Score, which grades the integrity of service on a scale of 1 to 5. Document ITU-T P800 is a document which is commonly referred to when measuring the MOS. The document actually describes how to perform subjective tests (i.e. with test persons), but the same scale is also often used for objective measurements, e.g. measurements of "integrity of service"

In some embodiments of the invention, it is the integrity of service which is used as an indicator of the "service quality", but examples of other such indicators also include the parameters accessibility and retainability.

In embodiments of the method 200, the information which is received by the node is information which has been provided and/or measured by the application, as opposed to information which has been provided and/or measured by the user terminal 107.

In embodiments of the method 200, the data which is extracted by the node on the impact of said reasons comprises an internal order of the reasons according to their impact. In other words, the reasons for the degradation of quality are, in such embodiments, ordered in, for example, a list, with the most serious reason at the top or bottom of the list, and the other reasons arranged accordingly in the list.

In embodiments, the method 200 comprising remedying one or more of the reasons for service quality degradation. For example, if the extracted data indicates to the node that jitter is the most harmful of the reasons for service quality degradation, the node can take steps to remedy the jitter, suitably by improving on the delay demands in a scheduling function in the node in the cellular communications system in which such a function is located, for example a "base station", although scheduling may also be handled by other nodes in the cellular communications system.

In addition, the reason or reasons which is/are remedied by the node can also be the reason which are the most economical to remedy, so that if, for example, the second most serious reason for service quality degradation is by far the easiest or least expensive to remedy, this can be the reason that is remedied instead of the most serious reason for service quality degradation.

In embodiments of the method 200, the method comprises storing one or more of the reasons for service quality degradation. Such stored reasons can then be used either by the node or by the operator of the system 100 for evaluation purposes. The reasons which are stored can also be stored along with their respective data on their impact on the service quality degradation, as well as, for example, data on when they were received.

In embodiments of the method 200, the data from the application is received by the node via the cellular communications system's 100 radio resource control protocol.

In embodiments of the method 200, the node in the cellular communications system 100 is a node in the Operations support System of the cellular communications system.

In other embodiments of the method 200, the node in the cellular communications system 100 is a node in the Network Management System of the cellular communications system.

Figure 3:
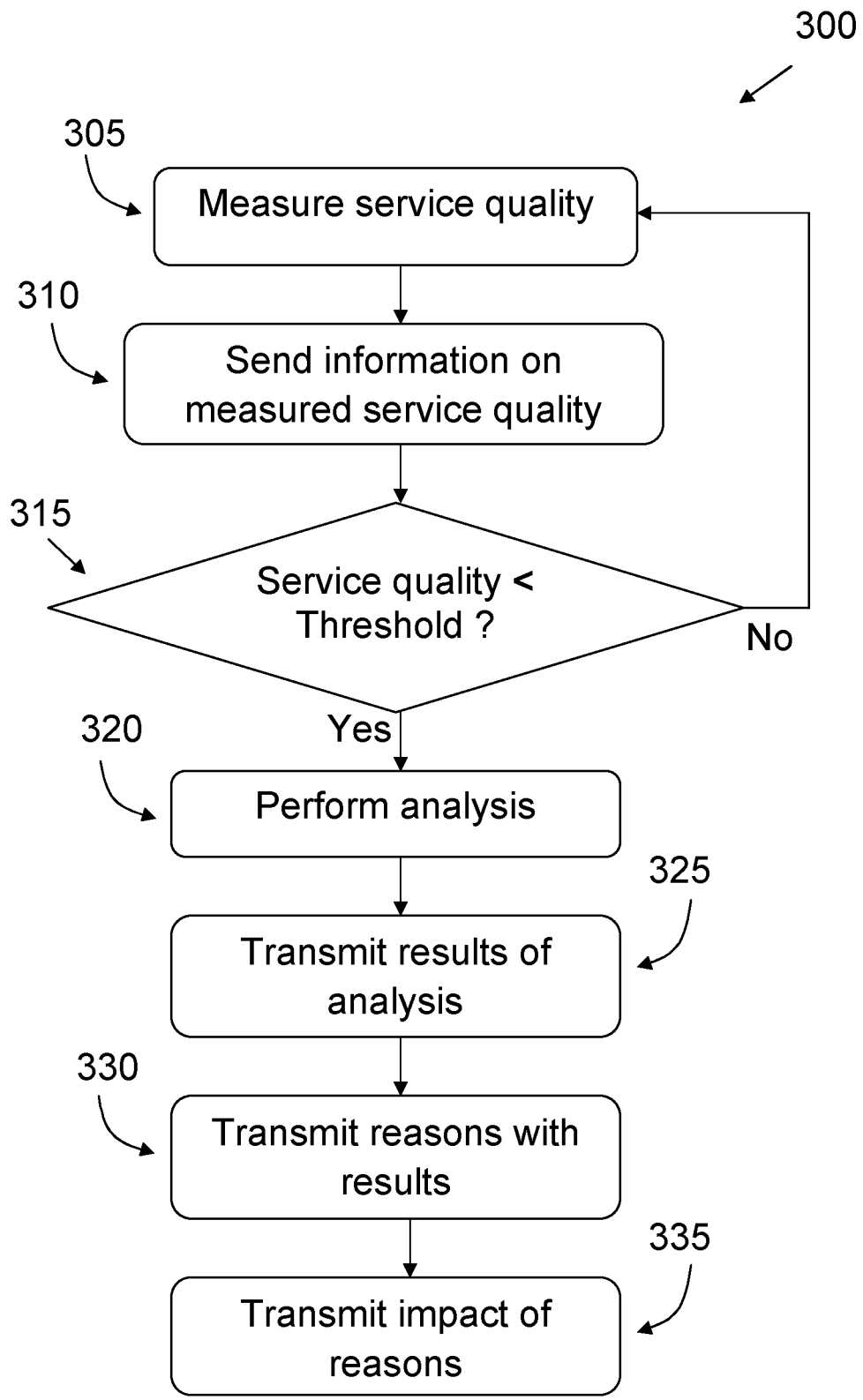
FIG. 3 shows a schematic flow chart of a second method of the invention.

FIG. 3 shows a flow cart of a method 300 for executing an application on a user terminal such as the one 107 in a cellular communications system such as the one 100. The method 300 comprises, as shown in step 305, measuring the service quality given to (or available to) the application in the cellular communications system 100 and, as shown in step 310, sending information on the measured service quality to a node in the cellular communications system 100.

As shown in step 315, the measured service quality is compared to a pre-defined threshold, and if the measured service quality is so degraded that it is below the predefined threshold, the method comprises, as shown in step 320, performing an analysis of why the measured service quality is below the threshold in question, and, step 325, transmitting the results of the analysis to a node in the cellular communications system 100. If the service quality is not degraded so that it is below the predefined threshold, step 305 is performed again.

As shown in step 330, the results of the analysis which are transmitted to a node in the cellular communications system 100 comprise one or more reasons for the degradation of the service quality as well as, as shown in step 335, information grading the impact of that or those reasons on the degradation of the service quality.

Examples of parameters which indicate quality of service include jitter, low bit rate, packet loss and delay. These parameters are continuously, or at discrete moments in time, measured, and if one or more of the parameters has/have fallen below its predefined threshold, this is reported as degraded quality of service to the node, which thus receives it as the information referred to in step 205 of the method 200.

Suitably, one or more of the following is performed by or in the application, as opposed to being performed in the user terminal:

Measuring 305 the service quality,
Sending information 310 on the measured service quality,
Performing 320 the analysis,
Transmitting 325 the results of the analysis to a node in the cellular communications system.

In embodiments of the method 300, the application also grades the impact of the reasons by ordering the reasons according to their impact. Thus, for example, the gravest reason will be put first or last in a list of reasons, and the other reasons will be included in the list accordingly.

Such a list may also show the relative impact of the reasons, not just in order of impact, but also in proportion to their impact, e.g. reason no 1—53%, reason no 2—25% and reason no 3—22%. Such proportions may also be provided without ordering the reasons in a list.

Turning now to how the information from the application is transmitted to the node in the cellular communications system, this is in embodiments of the method 300 done via the cellular communications system's radio resource control protocol.

In embodiments of the method 300, the node in the cellular communications system is a node in the Operations support System of the cellular communications system. In other embodiments of the method 300, the node in the cellular communications system is a node in the Network Management System of the cellular communications system.

In embodiments, the cellular communications system in which the method 300 is performed in is an LTE system or a 3G system.

Figure 4:
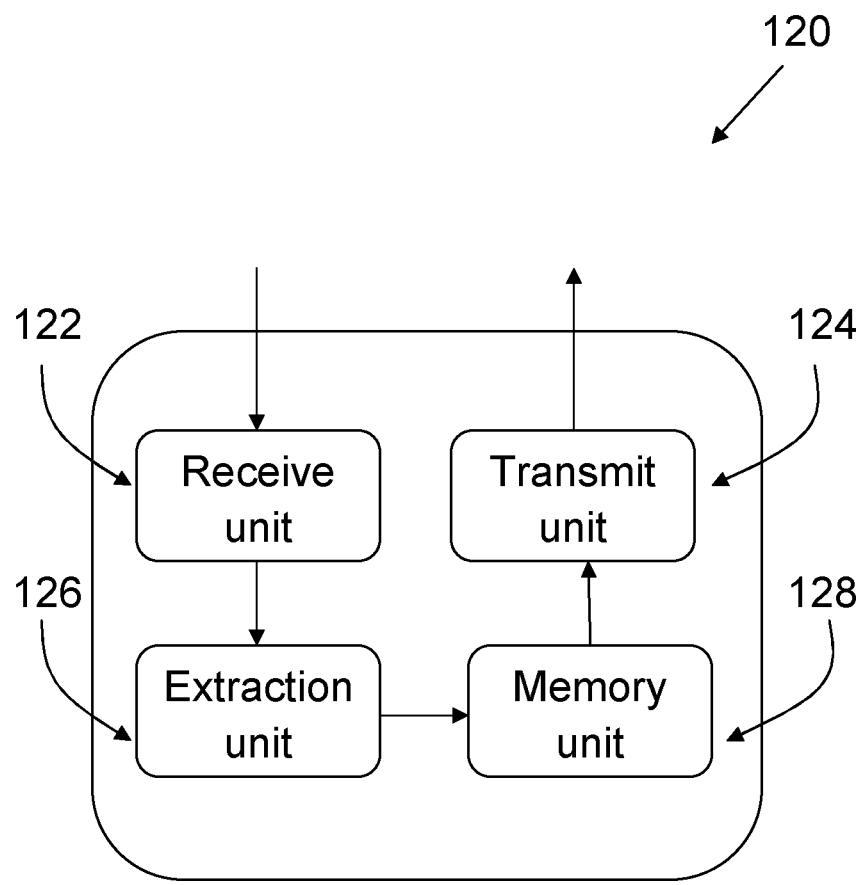
FIG. 4 shows a block diagram of a node of the invention.

FIG. 4 shows a block diagram of a node such as the one 120 for a cellular communications system such as the one 100. The node 120 comprises a Receive Unit 122, by means of which it receives information from other nodes in the cellular communications system, e.g. information from an application which has been or is being executed on a user terminal such as the one 107. The node 120 also comprises a Transmit Unit 124, by means of which it transmits information to other nodes in the cellular communications system.

In addition, the node 120 also comprises an Extraction Unit 126, by means of which the node 120 extracts data from the received information regarding the service quality given by the cellular communications system to the application. The extraction Unit 126 also serves to extract data indicating one or more reasons for any degradation of the service quality and data on the impact of those reasons on said degradation.

In embodiments of the node 120, the information which is received is information which has been provided and/or measured by the application which has been or is being executed on the user terminal.

In embodiments of the node 120, the extracted data on the impact of the reasons comprises an internal ordering of the reasons according to their impact.

In embodiments, the node 120 is arranged to remedy one or more of the reasons for service quality degradation.

In embodiments, the node 120 is arranged to store one or more of said reasons for service quality degradation, which s done by means of a Memory Unit 128, which is connected to the Extraction Unit 126.

In embodiments of the node 120, the reasons for service quality degradation comprise one or more of jitter, bit-rate, packet loss and delay.

In embodiments, the node 120 is arranged to receive, via the Receive Unit 122, the information from the application via the cellular communications system's radio resource control protocol.

In embodiments, the node 120 is a node in the Operations support System of the cellular communications system.

In embodiments, the node 120 is a node in the Network Management System of the cellular communications system.

In embodiments, the node 120 is a node in LTE or a 3G system.

The terminology used herein is for the purpose of describing particular embodiments only, and is not intended to limit the invention.

Embodiments of the invention are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:
1. A method for operating a node in a cellular communications system, the method comprising:
receiving information from an application which has been or is being executed on a user terminal in the cellular communications system, the method further comprising:
extracting data from the received information regarding the service quality given by the cellular communications system to the application as well as data indicating a plurality of reasons for any degradation of the service quality and data on the impact of said plurality of reasons on said degradation, wherein
data on the impact of said plurality of reasons comprises a list in which said plurality of reasons are ordered according to the impact of the respective plurality of reasons.

2. The method of claim 1, according to which the received information is information which has been provided and/or measured by the application.

3. The method of claim 1, comprising remedying one or more of said plurality of reasons for service quality degradation.

4. The method of claim 1, comprising storing one or more of said plurality of reasons for service quality degradation.

5. The method of claim 1, in which said plurality of reasons for service quality degradation comprise one or more of jitter, bit-rate, packet loss and delay.

6. The method of claim 1, according to which the data from the application is received via the cellular communications system's radio resource control protocol.

7. The method of claim 1, according to which the node in the cellular communications system is a node in the Operations support System of the cellular communications system.

8. The method of claim 1, according to which the node in the cellular communications system is a node in the Network Management System of the cellular communications system.

9. A method for executing an application on a user terminal in a cellular communications system, comprising:
measuring the service quality available to the application in the cellular communications system and sending information on the measured available service quality to a node in the cellular communications system,
comparing the measured available service quality to a predefined threshold, and, if the available service quality is degraded so that it is below said predefined threshold,
performing an analysis of why the available service quality is degraded, and
transmitting the results of said analysis to the node in the cellular communications system, the results comprising a plurality of reasons for the degradation of the available service quality as well as information grading the impact of said plurality of reasons on the degradation of the available service quality.

10. The method of claim 9, according to which one or more of the following is performed by or in the application:
measuring the available service quality,
sending information on the measured available service quality,
comparing the available service quality to a predefined threshold,
performing said analysis,
transmitting the results of said analysis to a node in the cellular communications system.

11. The method of claim 9, according to which the information grading the impact of the plurality of reasons comprises ordering the reasons according to their impact.

12. The method of claim 9, according to which said plurality of reasons for service quality degradation comprise one or more of jitter, bit-rate, packet loss and delay.

13. The method of claim 9, according to which the information from the application is transmitted via the cellular communications system's radio resource control protocol.

14. The method of claim 9, according to which the node in the cellular communications system to which the results of the analysis are sent is a node in the Operations support System of the cellular communications system.

15. The method of claim 9, according to which the node in the cellular communications system to which the results of the analysis are sent is a node in the Network Management System of the cellular communications system.

16. A node for a cellular communications system, the node being arranged to:
 receive information from an application which has been or is being executed on a user terminal in the cellular communications system, the node further being arranged to:
 extract data from the received information regarding the service quality given by the cellular communications system to the application as well as to extract data indicating a plurality of reasons for any degradation of the service quality and data on the impact of said plurality of reasons on said degradation, wherein data on the impact of said plurality of reasons comprises a list in which said plurality of reasons are ordered according to the impact of the respective plurality of reasons.

17. The node of claim 16, in which the received information is information which has been provided and/or measured by the application.

18. The node of claim 16, additionally being arranged to remedy one or more of said plurality of reasons for service quality degradation.

19. The node of claim 16, being arranged to store one or more of said plurality of reasons for service quality degradation.

20. The node of claim 16, in which said plurality of reasons for service quality degradation comprise one or more of jitter, bit-rate, packet loss and delay.

21. The node of claim 16, being arranged to receive the information from the application via the cellular communications system's radio resource control protocol.

22. The node of claim 16, being a node in the Operations support System of the cellular communications system.

23. The node of claim 16, being a node in the Network Management System of the cellular communications system.

\* \* \* \* \*